United States Patent [19]

Pischinger et al.

[11] Patent Number: 4,634,459
[45] Date of Patent: Jan. 6, 1987

[54] PARTICLE FILTRATION AND REMOVAL SYSTEM

[75] Inventors: Franz Pischinger, Aachen; Gerhard Lepperhoff, Eschweiler, both of Fed. Rep. of Germany

[73] Assignee: FEV Forschungsgesellschaft für Energie-Technik und Verbrennungsmotoren GmbH, Aachen, Fed. Rep. of Germany

[21] Appl. No.: 827,617

[22] Filed: Feb. 10, 1986

[30] Foreign Application Priority Data

Feb. 12, 1985 [DE] Fed. Rep. of Germany ....... 3504692
Jan. 9, 1986 [DE] Fed. Rep. of Germany ....... 3600373

[51] Int. Cl.$^4$ ............................................. B01D 46/30
[52] U.S. Cl. ....................................... 55/418; 55/419;
55/DIG. 30; 60/311; 422/176; 422/217
[58] Field of Search ................. 55/418, 419, 494, 496,
55/523, DIG. 30; 60/299, 311; 422/176, 217, 220

[56] References Cited

U.S. PATENT DOCUMENTS 3,824,080 7/1974 Smith et al. .................... 422/217 X
3,964,875 6/1976 Chang et al. ........................ 422/176
4,209,495 6/1980 Kobayashi et al. ................. 422/176
4,462,812 7/1984 Bly ....................................... 55/502

FOREIGN PATENT DOCUMENTS 2307215 8/1974 Fed. Rep. of Germany .
7329998 8/1974 Fed. Rep. of Germany .
2136537 12/1972 France .

Primary Examiner—Charles Hart
Attorney, Agent, or Firm—Watson, Cole, Grindle & Watson

[57] ABSTRACT

In a particle filter device containing porous filter material adapted for the exhaust flow of a diesel engine to filter particles from the exhaust gasses discharged from the engine, a system for the removal of filtered particles collected on the filter material, wherein the removal is effected by oxidation, includes a housing containing the filter material and having a flow control nozzle, the cross-section of which is reduced in the direction of the filter material for directing the gas stream to be purified toward the porous filter material in such a manner that described purification zones of the filter material are preferentially impacted by the through-flowing gas to be purified.

12 Claims, 13 Drawing Figures

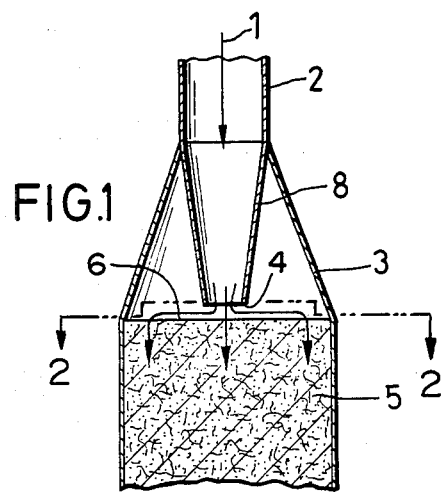
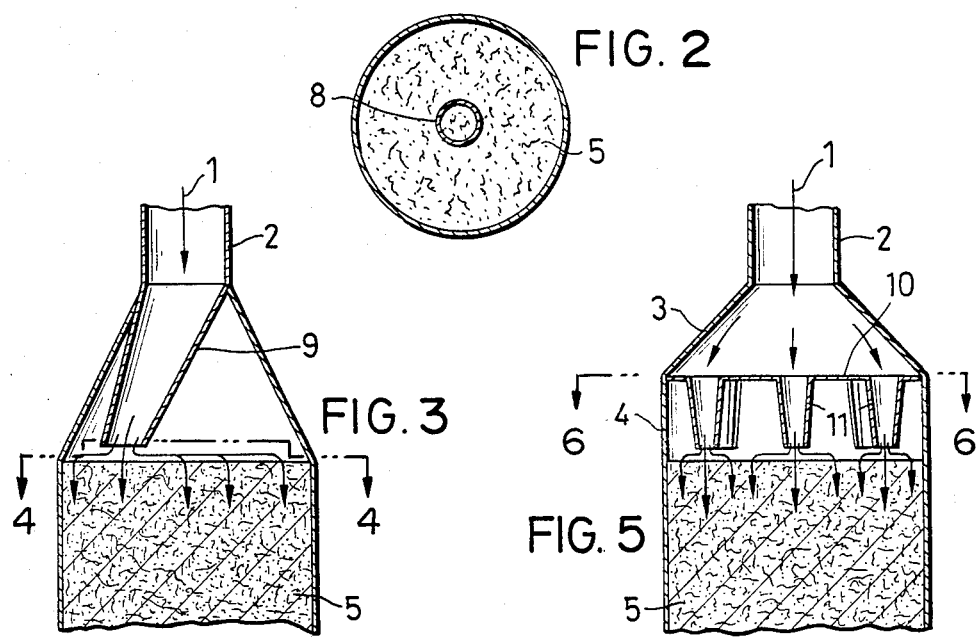
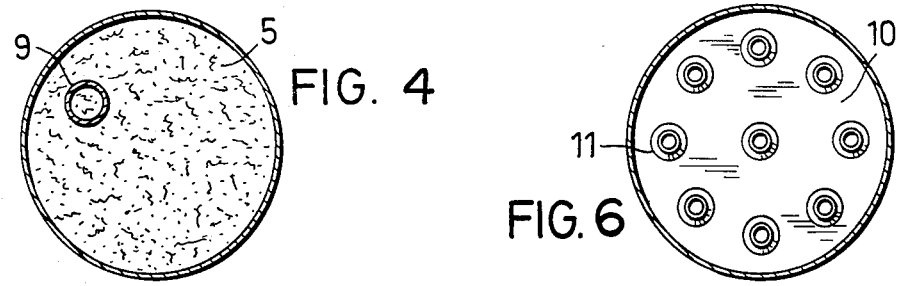

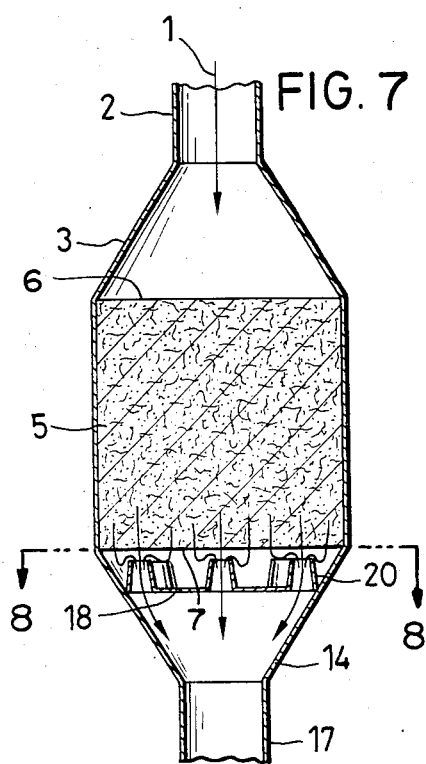
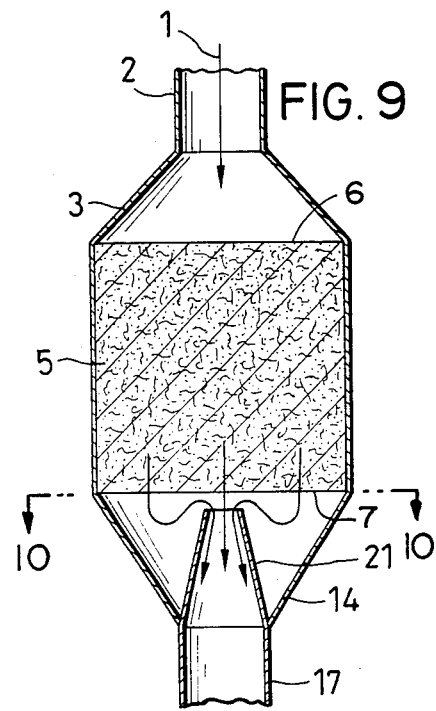
FIG. 7
FIG. 9
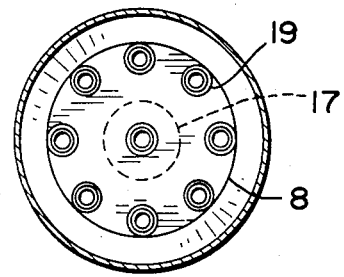
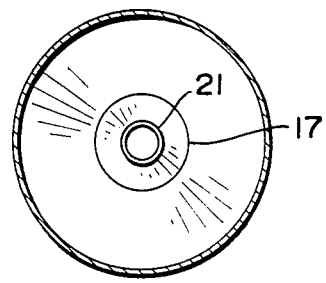
FIG. 8
FIG. 10

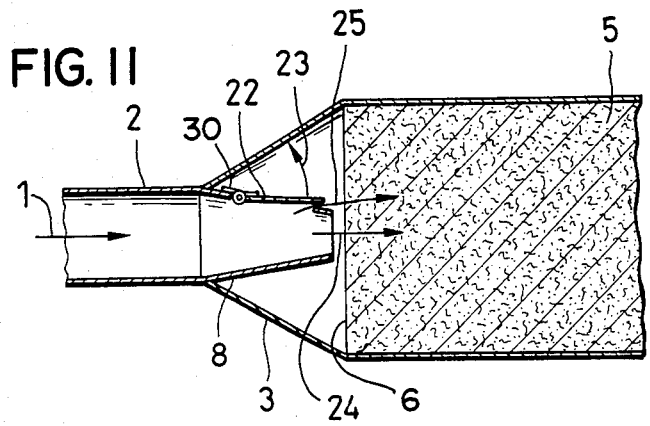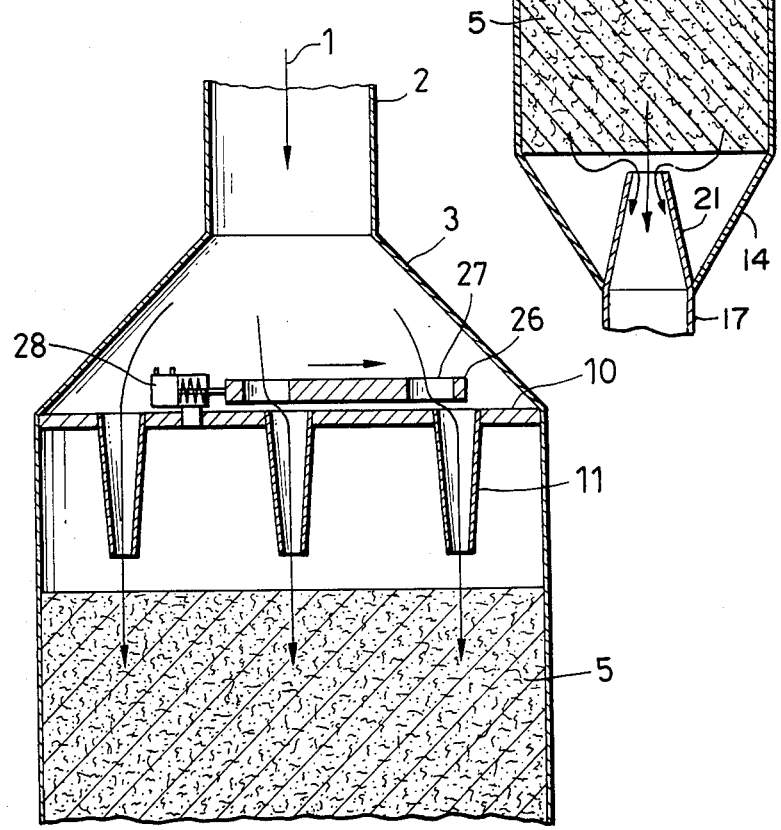

PARTICLE FILTRATION AND REMOVAL SYSTEM

BACKGROUND OF THE INVENTION

This invention relates generally to a system for the removal of filtered particles collected on porous filter material of a particle filter device adapted for gaseous media flow, particularly for the exhaust flow of a diesel engine to filter particles from the exhaust gases discharged from the engine, the removal being effected by oxidation.

It is known that in order to reduce particle emission in diesel engines, after-treatment systems are mounted in or operatively associated with the engine exhaust system. Such after-treatment systems essentially comprise filtration systems which trap and collect the solid and vaporous portions of the particle phase. The particles deposited in the filter, however, effect an increase of the flow resistance in the exhaust system, causing an increase in the exhaust back-pressure of the engine. With an increase in particle quantity, such can lead to engine stalling, depending on load and rpms. For this reason, it is requisite that the particles deposited in the filter be removed, either continuously or intermittently. And, it is usual for this removal to be carried out by means of oxidation of the particles.

Ceramic filters with a honeycomb structure, steel-wool filters and ceramic foam with or without a catalytic coating are among the structures which have been employed as filtration systems for the collection of particles, with intermittent or continuous particle incineration.

In order to initiate soot or particle incineration in the filter, sufficiently high temperatures and oxygen content are required. In this regard, this so-called minimum regeneration temperature depends on the mass of each particle collected in the filter, on the oxygen content of the exhaust gas, as well as on the mass flow of particles carried off and deposited in the filter. For production auto diesel engines at a filter efficiency level for solid components of approximately 90%, the lowest regeneration temperature without additional measures amounts to approximately 500° C., whereby the oxygen content must be greater than 3%.

Since without additional measures, these high temperatures can only be reached, in the exhaust of a diesel engine, in the full load range, though a filter regeneration is nonetheless required even at lower temperatures, several measures can be considered. With the provision of engine-related measures such as a injection timing and intake-air choking, as well as exhaust back-pressure increase, the exhaust gas temperature can be increased to regeneration in the area of low loads and rpms. By means of catalytic coating of the filter, a reduction of the regeneration temperature can be achieved. In addition, there is the possibility of achieving a reduction of the soot ignition temperature and regeneration by means of additives to the fuel. Such known measures are described, for example, in U.S. Pat. No. 4,462,812, column 6, lines 44–62.

Research has shown that in initiation of regeneration, soot oxidation begins at one location in the particle filter (the ignition core), and continues by spreading from this location in both axial and radial directions. In those instances where the filter is freely impacted by the inflow, such that at first approximation a largely homogeneous distribution of particles in the filter takes place, it has been shown, particularly in those instances where additives to the fuel have been employed as an aid to regeneration, that the location of the ignition core in the particle filter is spacially stochastically distributed. Moreover, the difficulty in the use of additives is that such can permit soot ignition to be effected at exhaust temperatures of well under 500° C., such as in the range of 100°–100° C. At such exhaust temperatures, the engine operates in engine map ranges of low load and rpms, but at a high oxygen content of the exhaust.

The soot combustion proceeds in radial and axial directions from the ignition core, whereby, especially at low loads and rpms, the oxidation occurs preferentially in the axial direction, and the soot combustion thereupon continues radially to the ignition channel. The sequential combustion-freeing of areas of the filter is such that in those areas of the filter where the soot has been burned up, flow resistance is considerably lower than in those areas where soot deposits remain. As a result, the larger portion of the exhaust flows through the filter areas with low resistance (regenerated filter areas), causing those areas where the soot remains deposited and the soot oxidation is taking place to experience a slight flow-through of exhaust gas. Since soot oxidation is an exothermic process, heat is released in this process, which is then carried away by the exhaust gas flow.

Due to a non-homogeneous distribution of the exhaust gas mass flow in partially regenerated filters, the heat removal in those areas of the filter which are burned free toward the end of the regeneration process, is very slight. This causes high temperatures to build up in the burning layer, and hence also in the filter material. The result is a very strongly non-homogeneous temperature in the filter with cool areas (regenerated filter portions with filter material temperatures equal to the exhaust gas temperature) and filter areas in the process of regeneration, which have slight heat removal from the exhaust gas, and in which peak temperatures occur. These high temperature levels lead to thermal stress, which often cause the destruction of the filter. In addition, with soot oxidation at slight removal of heat by the exhaust gas, high temperatures occur in the wall areas, so that the filter material (e.g., ceramic material with a melting temperature of 1350° C.) melts. Chipped filters and filters with melting of the material in the channels lead to a severe reduction of filter efficiency. Thus, with a honeycomb-shaped filter body with 100 cells/square inch and a diameter of 4.66 inches in which 3–4 channels are defective, a reduction of the level of filter efficiency of aproximately 30% is found.

SUMMARY OF THE INVENTION

It is therefore an object of the present invention to provide a particle filtration system of porous filter material, which can be of ceramic material, in which the heat released by the exothermic reaction of the oxidation process is distributed across the porous filter material sufficiently homogeneously that high local temperature peaks are avoided, the degree of effectiveness of the filter essentially remains unimpeded, and the filter has an optimal lifespan.

This objective is achieved in a particle filtration system of the invention with porous filter material for gaseous media in which the removal of filtered particles collected on the filter material takes place by means of oxidation by providing a flow control having a cross-section which decreases in the direction of the filter material, and by means of which the gas flow to be purified is directed onto the porous filter material in such a manner that prescribed purification zones are preferentially impacted by the inflow of the gas which is to be purified.

In accordance with the invention, a non-homogeneous soot layer thickness distribution is effected such that an homogenization of the temperature distribution is achieved for oxidation in such manner that the soot incineration occurs in the thick soot layer (large soot mass) at the outset, whereby at that location a sufficiently large flow of exhaust gas mass is available to carry the heat away. In other portions of the filter only a thin soot layer (small soot mass) is present during oxidation, and correspondingly less heat need be carried away by the lower local flow of exhaust gas mass.

Other objects, advantages and novel features of the invention will become more apparent from the following detailed description of the invention when taken in conjunction with the accompanying drawings.

BRIEF DESCRIPTION OF THE DRAWINGS

FIGS. 1, 3 and 5 are schematic illustrations, in longitudinal section, of particle filter system embodiments of the invention in which the flow control is so designed that the gas flow to be purified is guided in a directed manner onto the entry surface of the porous filter material;

FIGS. 2, 4 and 6 are cross-sectional views taken substantially along the lines 2—2, 4—4 and 6—6 of FIGS. 1, 3 and 5, respectively;

FIGS. 7 and 9 are views similar to FIGS. 1, 3 and 5 of further embodiments of the invention in which the purified gas flow passes out of the outflow or exit surface of the porous filter material;

FIGS. 8 and 10 are cross-sectional views taken substantially along the lines 8—8 and 10—10 of FIGS. 7 and 9, respectively;

FIGS. 11 and 12 are schematic illustrations, in longitudinal section, of further embodiments of the invention in which the relationship of the quantity of the gas to be directed to prescribed purification zones of the filter is variable to the remaining quantity of gas to be purified;

And, FIG. 13 is a view similar to FIG. 9 of yet another embodiment of the invention combining the aspects of FIGS. 1 and 9.

DETAILED DESCRIPTION OF THE INVENTION

In accordance with the invention, a targeted non-homogeneous soot layering of the filter can be effected by means of a nozzle-type flow control. As a result of this non-homogeneous soot layering, there are filter areas with higher particle masses and others with lower particle masses. In the area of higher particle masses, it can be shown that ignition of the soot takes place reproducible. Due to the location of the first ignition core in the area of higher particle deposit, and due to the oxidation with relatively greater flow of exhaust mass in this area, a large part of the heat which occurs particularly in the channels under circumstances of high deposit thickness, i.e., greater soot layer, is removed during the incineration of the soot. This causes a regeneration of the filter areas with greater soot layer thickness at the outset, whereby a sufficiently high flow of exhaust mass to remove the heat of the soot oxidation in high deposit areas is available, due to the flow resistance in areas of low deposit, in combination with the directed flow. Since the soot masses on the filter are less in the areas of low deposit, the heat released by oxidation is also less. Therefore, given equal removal of heat by the exhaust gas masses, no such high peak temperatures occur. Moreover, it is advantageous that, after the filter has been burned free, due to the directed flow, renewed particle deposit takes place predominantly here, in the area of this flow, so that in these areas, the flow resistance is very rapidly again increased, which causes a flow of the exhaust mass to be directed to the areas of the filter which, at the end of the regeneration process, have lower deposits. In such manner, heat removal in the areas of the filter which were last to be regenerated is increased. This contributes further to a decrease of peak temperatures in the filter areas which are the last to be regenerated. As a result of the deliberately provoked non-homogeneity of the deposit on the filter and the impacting inflow upon it, an improved even distribution of temperatures in the filter at the beginning and end of the regeneration process results. Consequently, smaller temperature gradients occur, and hence lower risks in regard to thermic breakage of the filter. In addition, the peak temperatures are reduced in the filter areas which regenerate last, which means that the danger of excessive demand on the material due to melting is reduced.

The flow control according to the invention comprises a flow control nozzle which decreases in cross-section in the direction of the filter material so as to have an advantageous effect on the inflow side of the filter material such that the directed gas flow essentially retains the prescribed direction regardless of the soot layer thickness, which produces the ignition process, with a prescribed point of ignition which is to be stabilized. This is particularly advantageous in situations with low flows of exhaust gas masses, since regenerating soot filters of conventional design have a tendency to overheat locally in such areas. With high flows of exhaust gas masses, the negative increase in exhaust gas backpressure can be counteracted by lateral bleed-off.

Also, on the outflow side of the filter material, flow control may be provided in the form of a nozzle having a cross-section which decreases in the direction of the filter material, since in such an arrangement a diffuser effect is introduced which effects the directional effect of the gas and/or improves it additionally.

A further advantage of the non-homogeneous filter deposits by means of the nozzle-type flow control of the invention, is the initiation of the ignition at low temperatures. It can be shown that the ignition temperature, e.g., with the use of fuel additives, but even without fuel additives, is dependent on the soot mass in the filter. The local increase of soot mass in the filter in preferred sections leads to ignition at low filter deposit quantities. With the use of fuel additives, a targeted increased concentration of the additives as well as possible improvement of ignition can be achieved due to the directed flow, which makes possible initiation of ignition both at low temperatures and at low soot masses.

With the use of chemical ignition aids in combination with fuel additives such as manganese, a targeted regeneration dependent on the filter deposit, and at low temperatures, can be achieved.

The advantage of low soot masses in the filter in regeneration is the greater security in regard to thermic destruction of the filter, as well as a reduction of fuel consumption and utilization of particle filtration in the exhaust, as the result of lower exhaust gas back pressure. Furthermore, the reduction of the additive quantities required for the initiation of regeneration can be achieved which results in the advantage that the filter has a greater life-span until it is blocked by additive residues, and additive emission behind the filter is likewise reduced.

Turning now to the drawings wherein like reference characters refer to like and corresponding parts throughout the several views, one embodiment of the device employed for the system in carrying out the invention is shown in FIGS. 1 and 2 as comprising a metal housing having an air inlet end in the form of an inlet pipe conduit 2 which is adapted to be connected so as to receive exhaust gasses in the direction of arrow 1 discharged from a diesel engine, not shown. As shown, the housing has an enlarged wall section, of circular cross-section, between this inlet and an opposite outlet end which, in the FIGS. 1,2 embodiment, is the same cross-section as the enlarged cross-section of the housing. Porous filter material 5, which may be a ceramic material, is contained within this enlarged wall section of the housing and is secured to the inner surface thereof without interuption about the entire periphery of the filter material between opposing inflow and outflow sides 6 and 7 of the filter. And, the housing has at least one flow control in the form of an integral nozzle 8, coaxial with the housing, and of a cross-section which decreases in a direction toward the filter material so that the gas to be purified impacts substantially centrally onto the entry surface or inflow side 6 of filter material 5. The flow control nozzle has a terminal end 4 spaced a short distance from inflow side 6 and, due to this air gap formed therebetween, the inflow gas to be purified is directed not only coaxially through a pipe 2 through the filter but also laterally from terminal end 4 and into the filter, as shown by the gas flow arrows of FIG. 1, which occurs particularly for high exhaust gas flows.

The FIGS. 3,4 embodiment is essentially the same as that of FIG. 1 except that the housing has an integral flow control nozzle 9 which is essentially bent relative to pipe 2 such that the nozzle is not coaxial with the exhaust gas inflow pipe, and its terminal end 4 is offset relative to the enlarged wall section of the housing, as shown in FIG. 4. With this asymmetrical inflow, both functional and spatial advantages can be achieved.

The embodiment of FIGS. 5,6 permits the distribution of the flow of gas to be purified to several locations on entry surface 6 of the filter material in a directed and accelerated manner. For such purpose, transition chamber 3 is closed off toward the bottom by a perforated plate 10 which may be of steel. A plurality of flow control nozzles 11 are attached to plate 10 at the openings provided in the plate, each nozzle having a cross-section which decreases in a direction toward the filter material and having a terminal end spaced a predetermined short distance from entry side 6 thereof, essentially the same as described with reference to FIG. 1. The flow of gas to be purified is indicated by arrow 1 and the arrows as the gas enters nozzle 11, as well as by the arrows indicating flow from terminal ends 4 of the nozzles both axially through and laterally from these ends and into the filter material, as shown.

In the embodiments of FIGS. 7, 8 and 9, 10, flow controls are provided through which the purified gas flow can be led away from the outflow sides 7 of the porous filter material. Thus, the exhaust gas flow to be purified, indicated by arrow 1, passes through pipe 2 and transition chamber 3, and into filter material 5. From there, the purified gas flows into a transition chamber 14 and then into an exit pipe 17. As can be seen in FIGS. 7,8, a perforated metal plate 18 with passage openings 19 is affixed within transition chamber 14 at a distance from filter material 5. And, the diffuser-type flow control nozzles 20 are secured to plate 18 in communication with openings 19. Each of these nozzles has a cross-section which decreases in a direction toward the filter material, as shown.

In the FIGS. 9,10 embodiment, a diffuser-type flow control nozzle 21 has a relatively narrow cross-section adjacent filter material 5 at a terminal end lying a short distance therefrom, and the cross-section increases in an outward direction as it merges with discharge pipe 17. The diffuser effect of nozzles 20 and/or 21 influences the the flow and pressure distribution within the porous trap material so that, similiar to the FIGS. 1-6, an inhomogenous distribution of the soot layer thickness is obtained leading to an homogenization of the temperature distribution.

In the FIG. 11 embodiment, the gas flow represented by arrow 1 passes in a manner similar to that of FIG. 1, through pipe 2 and into flow control nozzle 8 within transition chamber 3, and then impacts centrally onto inflow surface 6 of the filter material. The flow control nozzle has an elongated opening in its wall which is closed by a flap 22, or the like. The flap is spring bias closed by a spring 30. Thus, when the quantity of gas flow increases with increasing rpms of the engine, the pressure of the inflowing gas will swing the flap 22 open in the direction of arrow 23. As a result, the larger the quantity of inflowing gas per unit of time, the more the gas quantity represented by arrow 24 decreases in relation to the gas quantity represented by arrow 25 through the flap controlled opening in the flow control nozzle. With such an arrangement, it is possible to adapt the desired homogenization effect of the temperature distribution inside the filter material to the existing operating conditions.

In the FIG. 12 embodiment which corresponds essentially to the embodiment of FIGS. 5,6, a transversely extending movable plate 26 is mounted a short distance above plate 10 for transverse movement in the direction of the arrow thereof. This plate has through openings 27 spaced apart a distance equal to the spacing of the flow passages in plate 10. Plate 26 is controlled for transverse movement in the direction of its arrow by an activation device 28 and, depending on the existing operating conditions, for example such that plate 26 is in the position shown in FIG. 12 at low rpms, while the plate is moved with increasing rpms further to the right shown in this Figure, so that a larger portion of the gas can enter into the filter material through those nozzles 11 with which openings 27 are aligned. In such manner, the non-homogeneity of the filter depositing, which was first initiated, is partially eliminated, so that good, even distribution of the temperature in the filter can be achieved under all operating conditions.

The FIG. 13 embodiment is essentially a combination of FIGS. 1 and 9.

In the aforedescribed embodiments, those portions of the filter material into which the gas is fed from or into the flow control nozzle or nozzles, forms a purification channel or essentially parallel purification channels, outflow channels being formed in those portions of the filter material adjacent to and parallel to such purification channels. Thus, the flow control directs the gas stream to be purified onto the inflow openings of these purification channels, and/or leads it away from the outflow channels in such a manner that the prescribed purification channels or groups of purification channels are preferentially impacted by the inflow of the gas to be purified.

In the FIGS. 11 and 12 embodiments, the flow control is such that the relationship of the quantity of the gas directed to the prescribed purification zones to the remaining quantity of the gas to be purified, is variable. And, the flow control is such that the quantity of gas to be directed to prescribed purification zones in relation to the remaining quantity of the gas to be purified decreases with the increase in the quantity of flow.

Obviously, many modifications and variations of the present invention are made possible in the light of the above teachings. It is therefore to be understood that within the scope of the appended claims, the invention may be practiced otherwise than as specifically described.

What is claimed is:

1. In a particle filter device containing porous filter material adapted for the exhaust flow of a diesel engine to filter particles from the exhaust gases discharged from the engine, a system for the removal of filtered particles collected on said filter material, the removal being effected by oxidation, the system comprising a housing having an inlet end and an opposite outlet end for the exhaust gas to be filtered, said housing having an enlarged wall section between said ends, said filter material being contained within said wall section and being secured without interruption about the entire periphery and between opposing inflow and outflow sides thereof to the inner surface of said wall section, said housing having at least one flow control nozzle in communication with said inlet end, said nozzle having a cross-section which decreases in a direction toward said filter material and having a terminal end spaced a predetermined short distance from one of said sides of said filter material, the cross-section at said terminal end being substantially less than the cross-section of said filter material, whereby a non-homogeneous particle layer thickness is distributed laterally across said filter material by said flow control nozzle thereby resulting in relatively thick and thin particle layers for effecting an homogenization of the temperature distribution for oxidation as relatively greater and lesser exhaust gas mass flow is required for carrying away the heat generated during incineration and oxidation of said thick and thin layers, respectively.

2. The system according to claim 1, wherein said nozzle is in direct communication with said inlet end such that the exhaust flow through said inlet end and said nozzle impacts directly against said inflow side of said filter.

3. The system according to claim 1, wherein said filter material is located between said inlet end and said nozzle such that the exhaust flow through said inlet end impacts directly against said inflow side of said filter material and exits from said outflow side thereof in a directed manner and through said nozzle.

4. The system according to claim 2, wherein said housing has at least another flow control nozzle with a cross-section which decreases in a direction toward said filter material and has a terminal end spaced a predetermined short distance from said outflow side of said filter material.

5. The system according to claim 1, wherein said nozzle is coaxial with said housing.

6. The system according to claim 1, wherein said nozzle is non-coaxial to said housing.

7. The system according to claim 1, wherein said housing has a plurality of flow control nozzles in communication with said inlet end, each said nozzle having a cross-section which decreases in a direction toward said filter material and having terminal ends spaced at said distance from said one side, the combined cross-sections at said terminal ends being substantially less than said cross-section of said filter material.

8. The system according to claim 1, wherein means associated with said nozzle is provided for varying the exhaust gas flow through said nozzle.

9. The system according to claim 8, wherein said means comprises a flap controlled opening in said nozzle adjacent said terminal end thereof.

10. The system according to claim 8, wherein said means comprises a laterally extending plate having an opening, said plate being laterally movable for shifting said opening thereof into and out of alignment with said nozzle.

11. The system according to claim 7, wherein means associated with several of said nozzles is provided for varying the exhaust gas flow through said nozzles.

12. The system according to claim 11, wherein said means comprises a laterally extending plate having openings, said plate being laterally movable for shifting said openings thereof into and out of alignment respectively with said several nozzles.

* * * * *